(12) United States Patent
Policht (10) Patent No.: US 11,598,861 B2
(45) Date of Patent: Mar. 7, 2023

(54) OPTICAL DISTANCE DETECTION

(71) Applicant: Analog Devices, Inc., Norwood, MA (US)

(72) Inventor: Alexander Edward Policht, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 1013 days.

(21) Appl. No.: 16/240,464

(22) Filed: Jan. 4, 2019

(65) Prior Publication Data

US 2019/0369217 A1 Dec. 5, 2019

Related U.S. Application Data

(60) Provisional application No. 62/680,176, filed on Jun. 4, 2018.

(51) Int. Cl.
*G01S 7/4865* (2020.01)
*G01S 7/484* (2006.01)
(Continued)

(52) U.S. Cl.
CPC ............ *G01S 7/4866* (2013.01); *G01S 7/484* (2013.01); *G01S 7/4861* (2013.01); *G01S 7/4865* (2013.01); *G01S 17/08* (2013.01)

(58) Field of Classification Search
CPC ...... G01S 7/4866; G01S 7/484; G01S 7/4861; G01S 7/4865; G01S 17/08
See application file for complete search history.

(56) References Cited

U.S. PATENT DOCUMENTS

| | | | |
|---|---|---|---|
| 2009/0091738 A1* | 4/2009 | Morcom | G01S 17/89 356/5.03 |
| 2015/0028213 A1 | 1/2015 | Weinberg et al. | |
| 2019/0250257 A1* | 8/2019 | Finkelstein | G01S 7/4813 |

FOREIGN PATENT DOCUMENTS

| | | |
|---|---|---|
| CN | 102667521 A | 9/2012 |
| CN | 102680962 A | 9/2012 |

(Continued)

OTHER PUBLICATIONS

"Chinese Application Serial No. 201910478799.8, Response Filed Sep. 4, 2019 to Notification to Make Rectification mailed Jun. 24, 2019", w/o English Claims, 19 pgs.
(Continued)

*Primary Examiner* — Isam A Alsomiri
*Assistant Examiner* — Sanjida Naser
(74) *Attorney, Agent, or Firm* — Schwegman Lundberg & Woessner, P.A.

(57) ABSTRACT

In an optical detection system, a reference waveform can be used for automated analysis of a received waveform. The reference waveform can be adjusted (e.g., distorted) using information about one or more of a receive channel configuration or other aspects of the receive channel signal, facilitating a more effective comparison between a received impulse and the reference waveform. Such a comparison can be used in a time-to-digital conversion (TDC) technique, such as to provide delay values that can then be used to determine a distance between the illuminated target and an optical transceiver. Other techniques can be used to enhance range accuracy or resolution, such as using automated techniques for control of one or more of receive channel gain, summing or averaging (aggregation of received signals), or bias compensation (e.g., DC balancing).

20 Claims, 9 Drawing Sheets

(51) Int. Cl.
*G01S 7/4861* (2020.01)
*G01S 17/08* (2006.01)

(56) References Cited

FOREIGN PATENT DOCUMENTS

CN 105759279 A 7/2016
EP 3579016 B1 9/2021

OTHER PUBLICATIONS

"Chinese Application Serial No. 201910478799.8, Office Action dated Dec. 1, 2022", W/O English Translation, 11 pgs.

* cited by examiner

OPTICAL DISTANCE DETECTION

FIELD OF THE DISCLOSURE

This document pertains generally, but not by way of limitation, to estimation of distance between a detection system and a target, using an optical transmitter and an optical receiver.

BACKGROUND

In an optical detection system, such as a system for providing light detection and ranging (LIDAR), various automated techniques can be used for performing distance or "depth" estimation, such as to provide an estimate of a range to a target from an optical assembly, such as an optical transceiver assembly. Such detection techniques can include one or more "time-of-flight" determination techniques, such as using a maximum value determination, edge detection, or a constant fraction discriminator, as illustrative examples.

SUMMARY OF THE DISCLOSURE

Generally, in a "time-of-flight" detection system, an optical signal is received, such as in response to illumination of a scene or target by an optical transmitted. The optical signal generally includes at least one impulse corresponding to a transmit pulse that has been reflected or scattered by a target. The received optical signal can be discretized and quantized, to provide a time-series (e.g., a series of discrete-valued samples with respect to time) representative of the received optical signal. The time-series can be filtered or amplified. The waveform can then be processed using one or more techniques to estimate a distance or "depth" between the optical system and one or more targets. One or more targets can be automatically tracked at least in part using the depth estimate.

The present inventor has developed apparatus and techniques that can include use of a reference waveform for use in analysis of a received waveform. The reference waveform can be adjusted (e.g., distorted) using information about one or more of a receive channel configuration or other aspects of the receive channel signal chain. In this manner, a model reference waveform can be adjusted to distort the waveform in a manner similar to a transfer function of the receive signal chain, facilitating a more effective comparison between a received impulse and the reference waveform. Such a comparison can be used in a time-to-digital conversion (TDC) technique, such as to provide delay values that can then be used to determine a distance between the illuminated target and an optical transceiver. Other techniques can be used to enhance range accuracy or resolution, such as using automated techniques for control of one or more of receive channel gain, summing or averaging (aggregation of received signals), or bias compensation (e.g., DC balancing). The various examples mentioned above can provide enhanced performance as compared to other approaches such as maximum value determination or edge detection.

In an example, an automated method can be used for determining a distance between an object and an optical receiver using a reference waveform and a regression technique. The method can include establishing discrete-time samples comprising a time-domain waveform corresponding to a received optical signal, comparing the time-domain waveform with the reference waveform to determine a first delay value corresponding to a sample index where the time-domain waveform and the reference waveform are aligned, shifting the time-domain waveform using the first delay value, and determining a remaining phase offset of the time-domain waveform to determine a second delay value comprising a fraction of a sample interval. As an illustration, an electronic system can be used to implement such a method. For example, the electronic system can include an optical receiver including a receive amplifier circuit and an analog-to-digital converter (ADC) circuit, a memory circuit, and a control circuit coupled to the optical receiver, the ADC circuit, and the memory circuit, the control circuit configured to control the optical receiver and the ADC circuit to establish discrete-time samples comprising a time-domain waveform corresponding to a received optical signal, compare the time-domain waveform with the reference waveform to determine a first delay value corresponding to a sample index where the time-domain waveform and the reference waveform are aligned, shift the time-domain waveform using the first delay value, and determine a remaining phase offset of the time-domain waveform to determine a second delay value comprising a fraction of a sample interval.

Generally, the examples described in this document can be implemented in whole or in part within an integrated circuit package or module, such as monolithically integrated using a commonly-shared integrated circuit die. This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As mentioned above, an optical system can be used to automatically detect objects—such as obstacles—within a field-of-view. Various approaches can be used to perform such detection, including illuminating a field-of-regard using either a "flash" or scanned transmit scheme. Light that is reflected or scattered by objects in the field-of-regard can be detected and processed. The present inventor has developed circuits and techniques for performing a time-to-digital conversion (TDC) using a combination of analog and digital processing. An optical signal can be converted to an electrical signal using a photodetector (e.g., a phototransistor or photodiode), or an array of such detectors, to provide a received optical signal. In the analog domain, a receive signal chain can include one or more amplifiers having an adjustable gain, such as automatically adjusted to provide an output signal within a linear range of operation of the receive signal chain (e.g., avoiding saturation or poor signal-to-noise ratio in the presence of weak received signals). Also in the analog domain, a bias or lack of DC balance in the input signal can be compensated, such as by automatically determining an appropriate offset and applying the offset to a received signal before digitization. Once the received signal, corresponding to one or more reflected or scattered optical impulses, is digitized, the resulting received optical signal data (e.g., a waveform) can be filtered and then processed using a time-to-digital conversion (TDC) technique.

The TDC technique can include use of a correlation-based scheme involving comparing a reference waveform (e.g., a template) with a received impulse to determine a delay between an instant where an optical pulse is transmitted and an optical impulse is received. A resolution (e.g., minimum time increment) of a determined delay can be enhanced to less than a sample interval (e.g., a duration between discrete-time samples defining the received optical signal waveform), such as using a regression technique. The reference waveform can be selected or adjusted, such as to provide a distorted reference waveform that more closely mimics the distortion or other effects of the receive signal chain experienced by the received optical signal as it is processed by the system. Such distortion of the reference waveform can be referred to as "post-distortion," and can enhance correlation between the received optical signal and the reference waveform, when the two are time-aligned.

Figure 1:
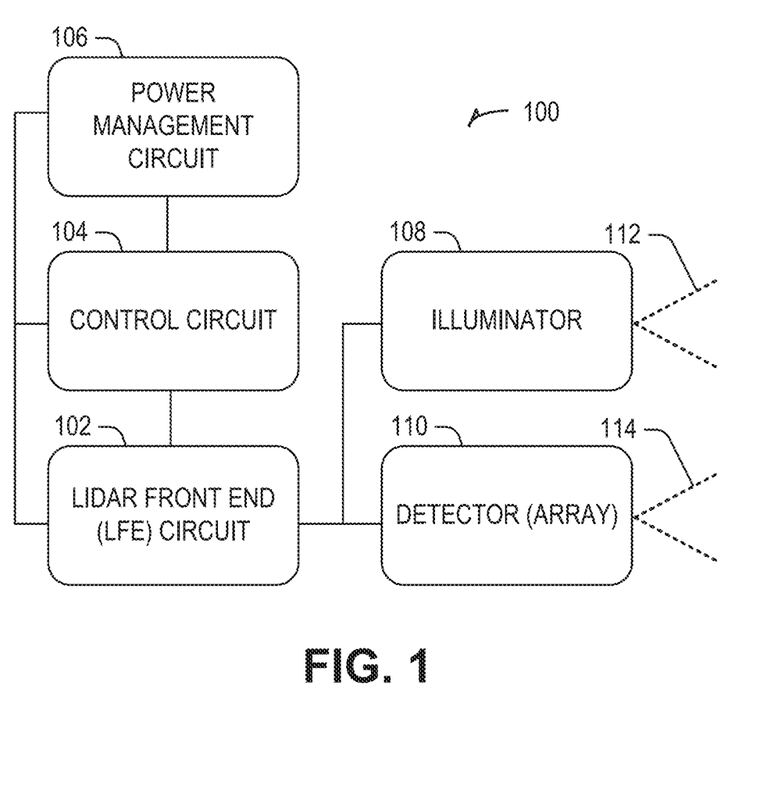
FIG. 1 illustrates generally a system, such as an optical detection system, that can include a transceiver comprising a light detection and ranging (LIDAR) "front end" circuit.

FIG. 1 illustrates generally a system, such as an optical detection system 100, that can include a transceiver comprising a light detection and ranging (LIDAR) "front end" circuit 102, along with an illuminator 108 (e.g., a diode or other laser module such as including output optics or beam steering capability to provide a specified transmit field-of-regard 112), and an optical detector 110 (e.g., an optical receiver comprising associated optics, such as can include a single photo-detector with an adjustable field-of-view 114 or an array of such detectors). The LIDAR front end (LFE) circuit 102 can include one or more optical receive channels along with one or more analog-to-digital converters, such as shown illustratively in the example of FIG. 2. The optical detection system 100 can be included as a portion of a device such as an airborne or ground-based drone, a robot (e.g., in a factory or warehouse), or other device where detection of nearby targets such as obstacles can help to facilitate autonomous operation or safety, for example.

The system 100 can include a control circuit 104 such as a microcontroller, microprocessor, or other circuit. The control circuit 104 can include a memory circuit, or the system 100 can include one or more separate volatile or non-volatile memory circuits. The system 100 can be communicatively coupled to or included as a portion of another electronic system such as the machine 700 shown and discussed in relation to FIG. 7. Returning to FIG. 1, the system can include a power management circuit 106 such as to provide one or more power supplies for, or power control to, other blocks of the system 100. In an example, the system 100 of claim 1 comprises a hardware module, such as integrated on or within a single device package or substrate.

Figure 2:
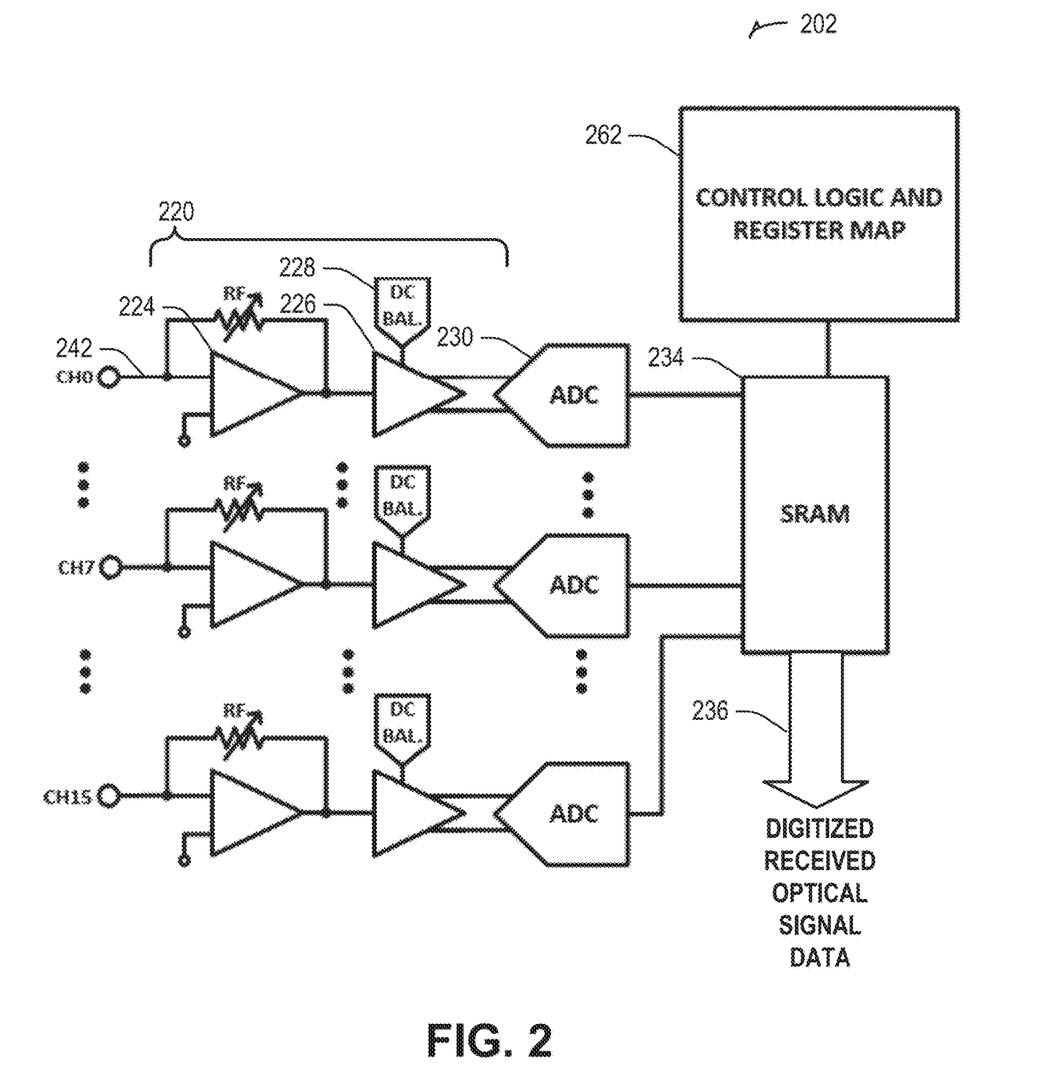
FIG. 2 illustrates generally at least a portion of a system, such as an optical detection system, comprising a light detection and ranging (LIDAR) "front end" circuit having multiple channels.

FIG. 2 illustrates generally at least a portion of a system, such as an optical detection system, comprising a light detection and ranging (LIDAR) "front end" circuit 202 having multiple channels (e.g., CH0 through CH15). Each channel can include an analog signal chain 220, such as comprising an input 242 to receive a signal from a photodetector, a receive amplifier 224 (e.g., a transimpedance amplifier (TIA) coupleable to an anode of a photodiode), and a differential-output preamplifier 226, such as configured to apply a specified compensation signal to a received optical signal output by the amplifier 224 to provide DC balance (e.g., to remove a bias from the received optical signal). A differential output of the preamplifier 226 can be provided to an analog-to-digital converter (ADC) circuit 230. The ADC 230 can be shared amongst multiple channels, and a particular channel can be selected by switches, or each channel can be electrically coupled to a corresponding ADC 230 as shown in FIG. 2. A digital cross-bar can be used to process an output of the ADC 230, such as to select amongst multiple ADC outputs to provide received reflection data for storage in a memory circuit, such as a static read-only-memory (SRAM) circuit 234. In the example of FIG. 2, each ADC output is coupled to the SRAM circuit 234. Other portions of the system, such as a micro-controller or digital signal processor can retrieve digitized received optical signal data 236 from the memory circuit (e.g., SRAM 234) to apply filtering or perform time-to-digital conversion. The "front end" circuit 202 can include a control circuit, such as having control logic and a register map 262 to provide control of various blocks of the "front end" circuit 202.

Generally, the LFE circuit 202 can be triggered in response to illumination of a scene by an optical transmitter. Illumination of the scene and a corresponding acquisition by the LFE circuit 202 can be referred to as a frame acquisition. Multiple acquisitions can be performed and the resulting received optical signal waveforms can be aggregated such as via summing or averaging. For example, summing a series of time-aligned received optical waveforms can provide a processing gain, and a count of such sums can be a parameter that is automatically adjusted to provide another form of automatic gain control (AGC) behavior. Such aggregation can be performed in hardware, such as using digital logic and timing control circuits configured by hardware registers and without requiring intervention by a general-purposes processor circuit. In an example, a delay interval between frame acquisitions can be either fixed or randomized. In another example, the amplifier 224 can have a variable gain, such as controlled by a feedback resistor, RF.

The feedback resistance value, RF, is generally selectable amongst a range of fixed resistance values (such as a digitally-controllable array of parallel resistors each having a similar value such as five kilo-ohm to provide a "quantized" gain architecture). In another aspect of AGC behavior, the feedback resistance value, RF, is controlled automatically either independently or in combination with a parameter relating to aggregating acquisitions, as mentioned above. In this manner, received optical impulses can be kept within the dynamic range of the receive signal chain 220, such as concentrated within a linear region of operation. Monitoring of a received optical signal for AGC can be performed using a mixed-signal control loop, such as involving monitoring a digitized signal at an out of the ADC 230 (e.g., to determine whether received impulses are either saturating the receive signal chain 220 or are nearing a limit of detection (e.g., near buried in the noise floor or buried in the noise floor). If multiple parameters are adjustable, a priority scheme can be established where one element is adjusted in preference to another, until a limit is reached. For example, if the amplifier 224 is at its highest or lowest gain setting, then a count of summed acquisitions can be adjusted (e.g., increased if the amplifier 224 is at its highest gain or decreased if the amplifier 224 is at its lowest gain).

As mentioned above, a bias or lack of DC balance in the input signal can be compensated, such as by automatically determining an appropriate offset and applying the offset to a received signal before digitization. A mixed-signal control loop can be used for DC balance compensation. For example, the control loop can determine a mean value or other central tendency of an error representing a difference between a desired input offset value (e.g., zero) versus a present offset value. Parallel pathways can provide one or more of a proportional control term (e.g., scalar value) multiplied by the error, an integral term representing an aggregated value of a prior error and the present error, and a derivative term representing a finite difference between a present error value and a prior error value. The proportional, integral, and derivative terms (PID) terms can be weighted and summed, and a result can be encoded and stored in a register 228, (e.g., DC BAL) and used to apply an offset at the preamplifier 226 or other portion of the receive signal chain. As in the example of the AGC scheme, the DC balance scheme can be hardware-implemented without requiring intervention or execution by a general-purposes processor circuit.

Signal Processing Pipeline

Figure 3A:
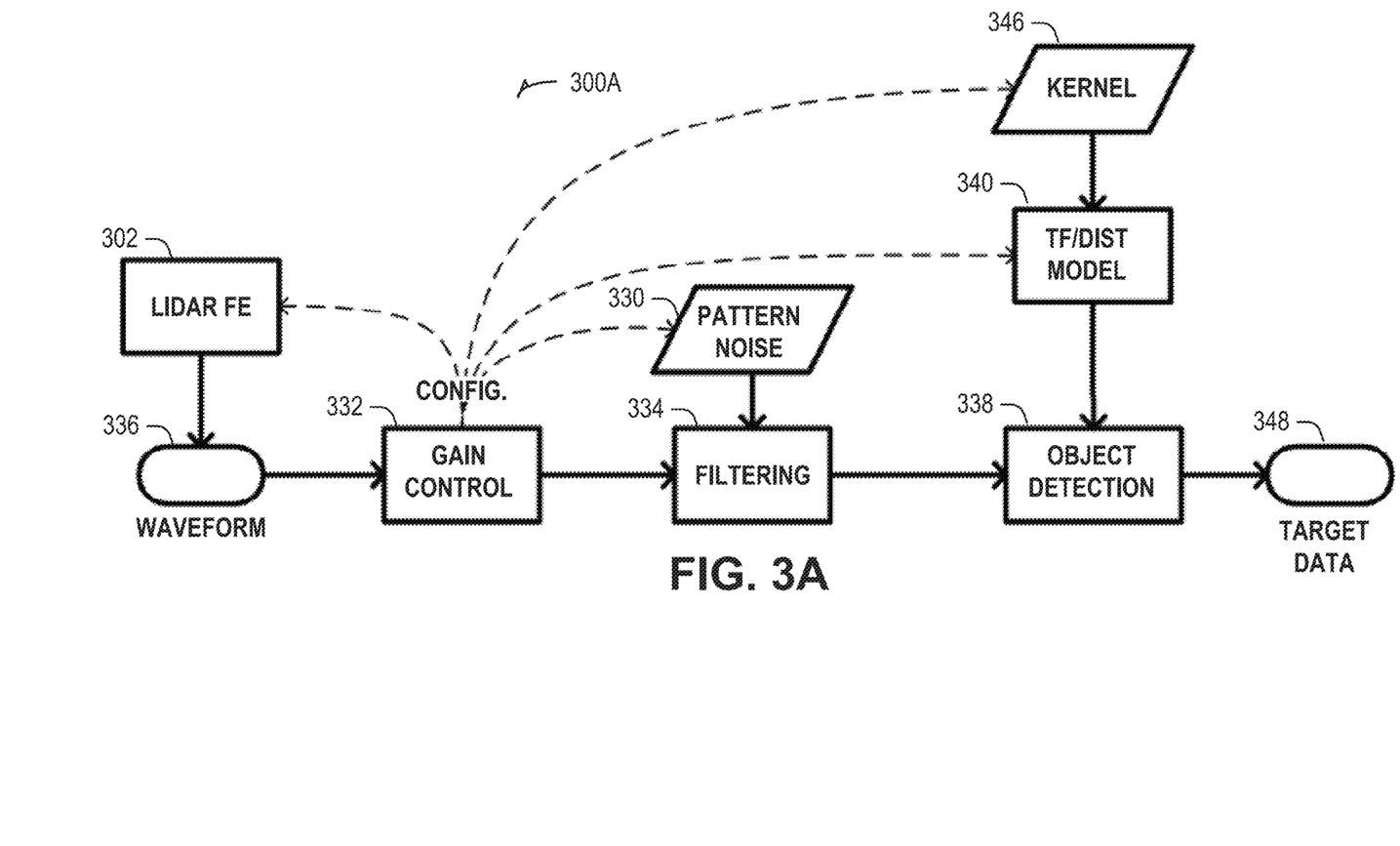
FIG. 3A illustrates generally an example comprising a signal processing scheme for processing received optical data, such as a scheme for performing time-to-digital conversion (TDC).
Figure 5:
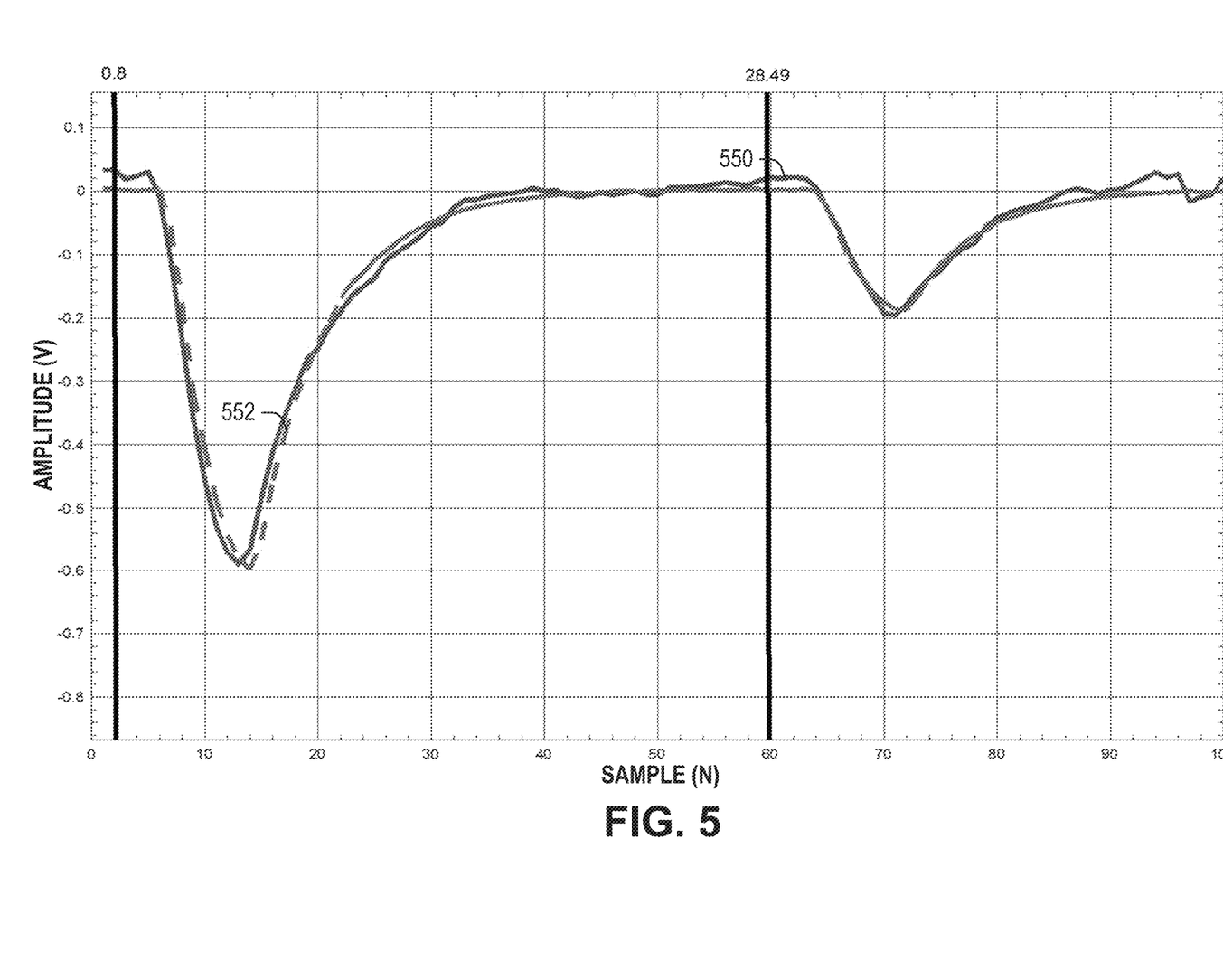
FIG. 5 illustrates generally an illustrative example of a simulation comprising a received optical signal and a corresponding reference waveform, when time-aligned.

FIG. 3A illustrates generally an example comprising a signal processing scheme 300A for processing received optical data, such as a scheme for performing time-to-digital conversion (TDC). As mentioned above, a LIDAR front end (LFE) circuit 302 can provide waveform data 336 corresponding to a digitized received optical signal. For example, such data 336 can include a matrix representation having dimensions N×M, where N represents a count of channels and M represents a count of samples for each channel such as sampled at a rate, $F_s$. A gain control block 332 can implement at least a portion of an automatic gain control (AGC) scheme as discussed above in relation to FIG. 2. For example, the gain control block 332 can command an increase or decrease in an analog amplifier circuit gain, or a change in a count of aggregated receive acquisitions, or a combination of both. In this manner, the gain control block 332 can monitor or "parse" the received signal to determine, for example, whether saturation is occurring or no probable signal returns exist. A filtering block 334 can be used to remove one or more of stochastic (e.g., random) or non-stochastic (e.g., pattern-based noise). In an example where pattern-based noise is removed, one or more templates such as from a look-up-table-based pattern noise 330 template can be applied for noise filtering by the filtering block 334, in the digital domain. An example of a digital filter scheme is shown illustratively in FIG. 5B, such as to process an input signal having various noise contributions as shown in FIG. 5A.

Returning to FIG. 3A, a filtered, gain adjusted, and DC balanced representation of the received optical signal data can be provided to an object detection block 338. The object detection block can implement a TDC technique as mentioned in relation to other examples herein. For example, the TDC technique can include use of a kernel 346 representative of a received optical signal waveform. The kernel 346 can be stored in memory as an a priori model or adaptively determined. The kernel 346 can represent an idealized received optical signal waveform, which can then be distorted such as using a transfer function (TF) model or distortion model (TF/distortion model 340). The resulting reference waveform can be provided to the object detection block 338 for comparison with the processed received optical signal data, and one or more distance determinations can be made using delays calculated using the TDC techniques described herein. Resulting target data 348, including one or more target distances, can be provided as an output of the object detection block 338, such as by determining such distances from delay information using a time-of-flight calculation.

Figure 3B:
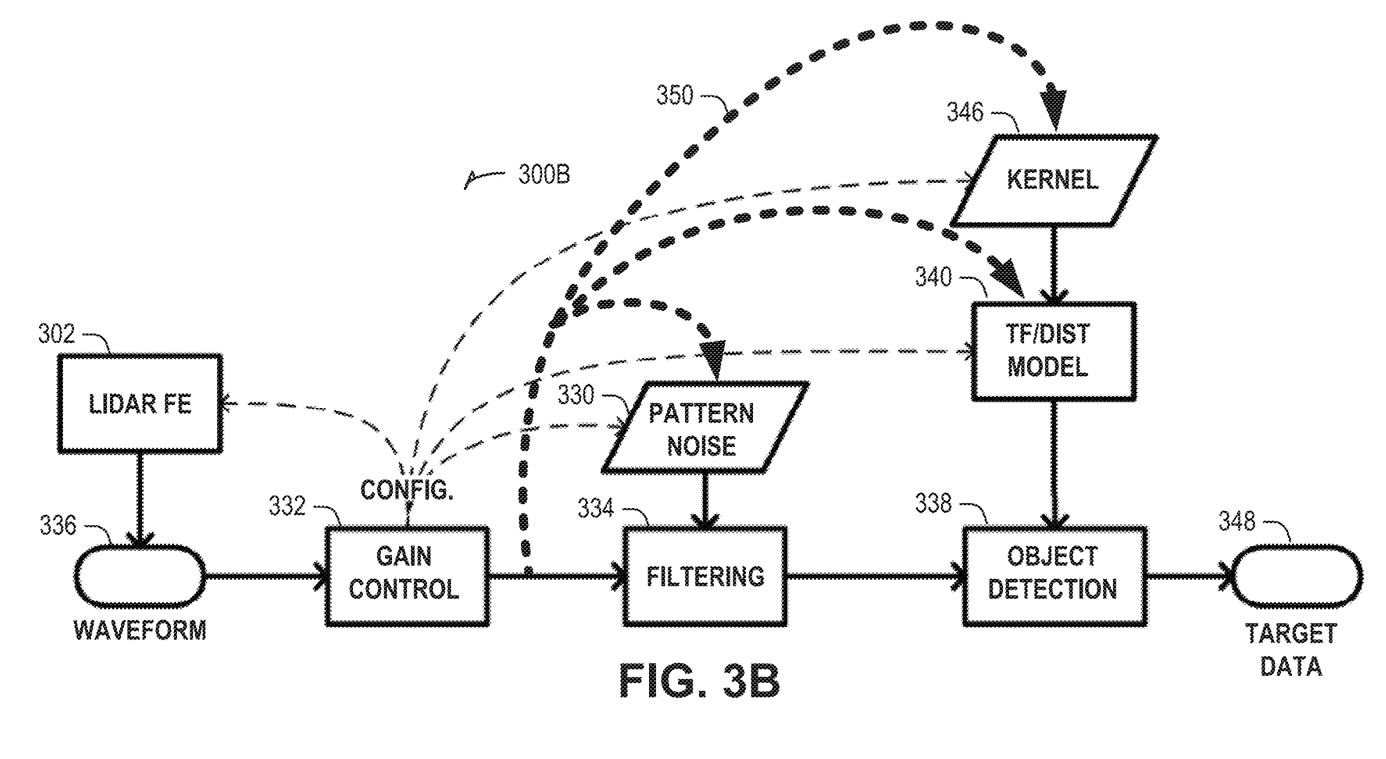
FIG. 3B illustrates generally an example comprising the signal processing scheme for processing received optical data of FIG. 3A, showing an example of data flow for establishing one or more of a reference waveform kernel, a pattern noise template, or a transfer function (TF)/distortion model.

FIG. 3B illustrates generally an example comprising the signal processing scheme for processing received optical data of FIG. 3A, showing an example 300B of data flow 350 for establishing one or more of a reference waveform kernel 346, a pattern noise template 330, or a transfer function (TF)/distortion model 340. In the scheme shown in the example 300B of FIG. 3B, configuration information relating to the optical detection system, such as one or more receive signal chain parameters (e.g., gain, count of aggregated frames, selected channel, selected ADC, or other state information), can be matched with corresponding measured or stored templates or models. Other state information such as indicative of environment (e.g., temperature) or external factors (e.g., ambient light level, interference presence) can be matched with corresponding measured or stored templates or models. Such state-dependent behavior can be used to enhance range estimation accuracy because system state can impact receive signal chain characteristics such as bandwidth, phase margin, linearity, or other characteristics.

As an illustrative example, the pattern noise template 330 can include a look-up table (LUT) or other data structure having various pattern templates selectable depending on system state (e.g., dependent on timing information such as a presence or absence of one or more clock signals, rates of such signals, a count of active channels, or the like). During a calibration operational mode, the pattern noise template 330 can be captured under various conditions. Similarly, the TF/distortion model 340 can be established such as via simulation or measurement, for example during production test, or in a field-triggerable calibration operational mode to provide one or more kernel 346 waveforms or models available for use on a selectable basis based on a system state. For example, one or more of a particular kernel 346 waveform or model 340 can be automatically selected in response to a system state defined by a receive channel gain, an aggregation count, a sampling rate, a selected channel (or group of channels), or other parameters. In an example, a "maximum length" sequence (m-sequence) of impulses can be injected at low amplitude, received, and an autocorrelation technique can be used to extract data indicative of a transfer function for a particular system state.

Filtering Technique

Figure 4A:
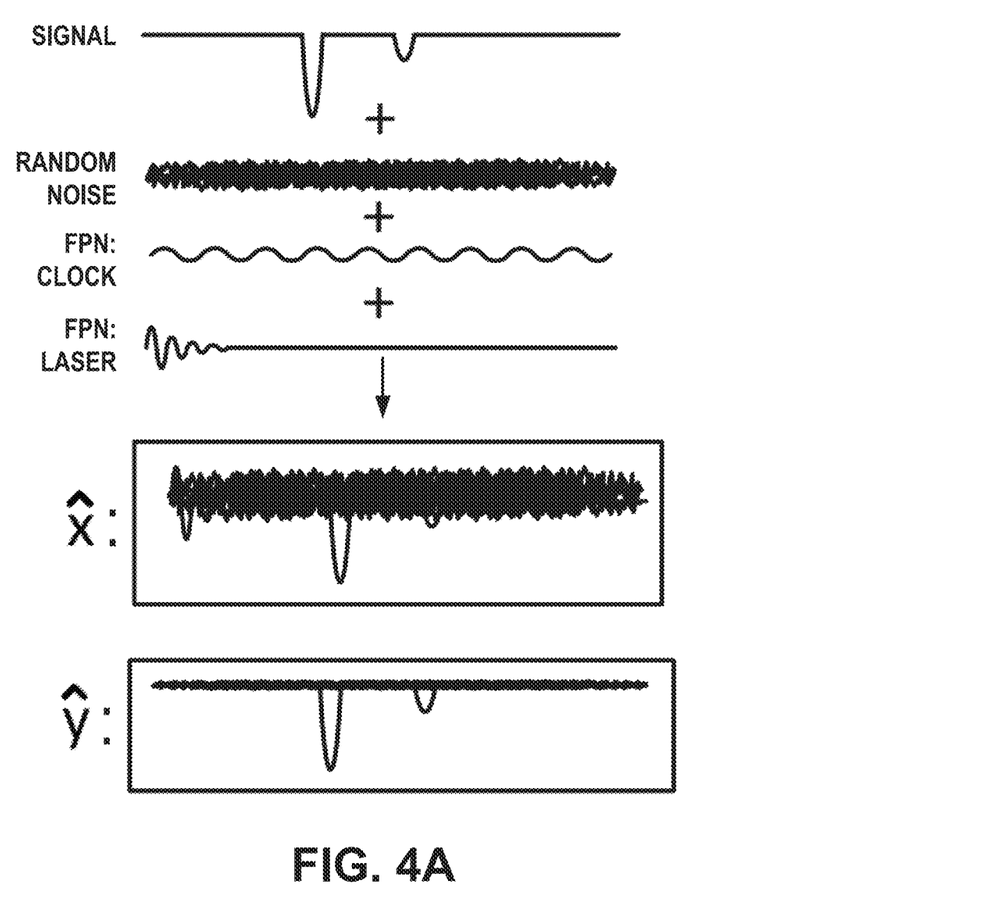
FIG. 4A illustrates generally an illustrative example of an idealized optical signal to be received, along with various sources of noise that can appear in a non-ideal received optical signal (e.g., an input signal), along with a filtered representation of the non-ideal received optical signal (e.g., an output signal).

FIG. 4A illustrates generally an illustrative example of an idealized optical signal, SIGNAL, to be received, along with various sources of noise that can appear in a non-ideal received optical signal (e.g., an input signal, $\hat{x}$), along with a filtered representation of the non-ideal received optical signal (e.g., an output signal, $\hat{y}$). The noise can include stochastic (e.g., random) noise such as corresponding to Johnson or shot noise, along with noise from deterministic sources (e.g., "fixed-pattern noise"). For example, in FIG. 4A, random noise can be additive with fixed-pattern noise relating to a synchronous signal such as a clock signal (e.g., FPN: Clock) along with noise relating to illumination, such as pulsed noise corresponding to laser pulses or related timing signals (e.g., FPN: LASER).

Figure 4B:
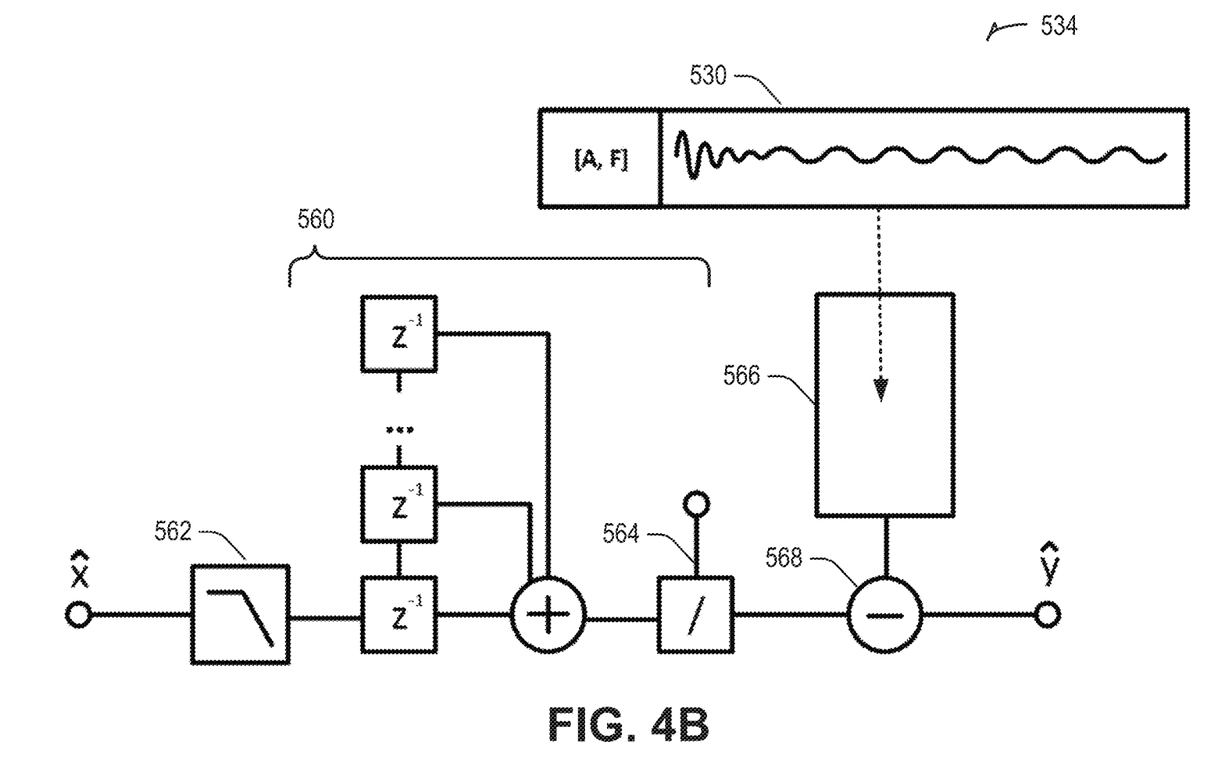
FIG. 4B illustrates generally a filter topology, such as can be implemented as a digital filter, to receive the input signal and to provide the output signal.

FIG. 4B illustrates generally a filter 534 topology, such as can be implemented as a digital filter, to receive the input signal, $\hat{x}$, and to provide the output signal, $\hat{y}$. An input signal such as represented by $\hat{x}$ can be received. The input signal, $\hat{x}$, can represent a received optical signal. A matched-spectrum filter 562 and a moving average filter 560 can provide filtering for a stochastic component of the noise in the input signal, $\hat{x}$, such as using a delay line having N elements, coupled to a summing node, and then divided by the factor, N. To remove a non-stochastic component of the noise, a fixed pattern (FP) noise template 530 can be applied to the received optical signal, such as subtracted from the received optical signal in the time-domain on a sample-by-sample basis. The FP noise template 530 can be one amongst many stored in a memory such as in a look-up table 566. A selected FP noise template 530 or a combination of FP noise templates to be applied can be selected, such as in response to information about a system state, in a manner similar to selection of other receive signal chain parameters such as the distortion model or kernel waveform.

TDC Technique

FIG. 5 illustrates generally an illustrative example of a simulation comprising a received optical signal 550 and a corresponding reference waveform 552, when time-aligned. As mentioned above in relation to FIG. 3A and FIG. 3B, the reference waveform can be established from a kernel waveform (such as selected from a group of kernel waveforms stored in a look-up table). The reference waveform 552 can be produced by applying a transfer function (e.g., distortion) model to a selected kernel waveform. Such processing can establish a reference waveform 552 that more closely mimics received optical impulses to enhance operation of a TDC technique. The selection of one or more of the kernel waveform or the model can occur automatically in response to a system state, as mentioned above. As described below in relation to the TDC scheme, the reference waveform 552 can be time-aligned with an impulse waveform in the received optical signal, such as using a cross-correlation between digital representations of the reference waveform 552 and the received optical signal 550. A sample-lag corresponding to a peak in the cross correlation (e.g., an argmax operation indicating a sample index where the determination of the cross-correlation indicates a maximum) is indicative of a delay value. The delay value generally corresponds to a time-of-flight of the optical illumination signal and its reflection or scattering by a target. A resulting distance can be estimated from such a delay using the propagation velocity of the illumination and reflected (or scattered) signal to determine a total distance, then dividing the distance in half.

In an example, to perform the TDC technique mentioned herein, a discrete-time (e.g., digitized) time-domain signal is established, representative of a received optical signal 550. The time-domain signal can be established using the LFE circuit of FIG. 2 and the signal processing pipeline of FIG. 3A, as an example. The received optical signal can include one or more impulses representative of scattered or reflected pulses elicited by illumination of a target region. The time-domain signal can be provided as an input, along with a reference waveform 552. The TDC technique can be used to produce one, or more distance estimates, such as corresponding to a group delay of received optical impulses having waveforms similar to the reference waveform. The representation below describes a general technique for estimating a delay value using a cross correlation between the reference waveform and a signal waveform.

$x\ \text{corr}_{ref\ sig} = \text{crosscorrelation}(\text{reference},\text{signal})$
$\text{delay}_{sample} = \text{argmax}(x\text{corr}_{ref\ sig})$ In the expressions above, $\text{xcorr}_{ref\ sig}$ represents a cross-correlation between reference and sample waveforms, and $\text{delay}_{sample}$ represents an integer delay value corresponding to the sample lag (e.g., a count or sample index) where cross-correlation is maximized. Because light propagates extremely rapidly, even a relatively high sample rate may result in a sample interval (a duration between samples) corresponding to a spatial distance on the order of tens of centimeters or meters. The present inventor has recognized that providing only an integer-valued sample index for the cross correlation mentioned above may result in significant distance estimation error due to such delay between samples. Accordingly, the present inventor has developed a technique to provide an estimate of delay at sub-sample resolution (e.g., in terms of a fraction of a sample).

In an example, to calculate delay comprising a fraction of a sample duration (e.g., a sub-sample fraction), a series of received impulses can be identified, corresponding to the reference waveform, using cross-correlation as mentioned above. Respective impulses can be shifted to time t=0, such as one-at-a-time, and a linear phase offset (e.g., a residual phase offset) can be determined to solve for an approximate sub-sample delay fraction. For example, a best fit can be determined for a slope of a phase corresponding to a time delay. A correspondence between a time-domain shift and frequency domain phase can be represented as a relationship between a time-domain (e.g., time series) signal. "x," having index. "n" shifted by "l" samples and a corresponding frequency domain representation of the time-series, x, represented by magnitudes $X_k$ for each frequency bin, k, and a corresponding exponential term as shown below, $$\left(x_n[n-l] = > X_k * e^{-\frac{2\pi i k l}{N}}\right),$$

where N represents a record length of the time series and a corresponding count of frequency bins, and "i" represents the imaginary number, i=sqrt(−1). Using a weighted linear regression technique (expressed below), the estimated slope corresponds to the delay, and a signal-to-noise ratio (SNR) for an associated phase can be used as a weight. For example, using a least squares approach, the slope and corresponding sub-sample offset (e.g., "$\text{delay}_{fraction}$") can be represented as follows:

$$\hat{A} = W * \left[ -\frac{2\pi i * k}{N} \right]$$

$$\hat{B} = W * L\text{xcorr}_{ref\ sig}$$

$$delay_{fraction} = \frac{\hat{A}^T}{\hat{A}^T * \hat{A}} * \hat{B}.$$

In the expression above, $\hat{A}$ can represent a vector defined by phase shift exponent values for each frequency bin, k, multiplied by a weighting factor, W. The weighting factor can be computed as a magnitude of a discrete Fourier transform, such as a Fast Fourier Transform (FFT), of a corresponding frequency bin when the reference waveform (e.g., the selected reference waveform kernel) is transformed from the time-domain to the frequency domain using the discrete Fourier transform. Weighting values, W, may be re-computed or retrieved when the reference waveform kernel is changed. The vector, $\hat{B}$, can represent a vector of phase values comprising the weighting factor, W, for a given frequency bin, multiplied by a phase of the cross correlation of the reference signal corresponding to that frequency bin, after the cross correlation has been shifted by −1* ($delay_{sample}$) and transformed from the time-domain into the frequency domain (e.g., using an FFT). A resulting $delay_{fraction}$ value is real-valued and represents a non-integer (e.g., fractional or partial) sample interval that can be added to the integer-valued $delay_{sample}$ value to obtain a total delay value. A distance corresponding to the delay value can then be determined, such as to estimate a distance or depth between a target and the optical transceiver (e.g., the total delay generally corresponds to a round-trip path between the optical transceiver and the target, which can be used to compute a distance when the propagation velocity is known, such as using the speed of light or a value of the group velocity of an electromagnetic wave propagating through a dielectric medium having known constitutive parameters).

Figure 6:
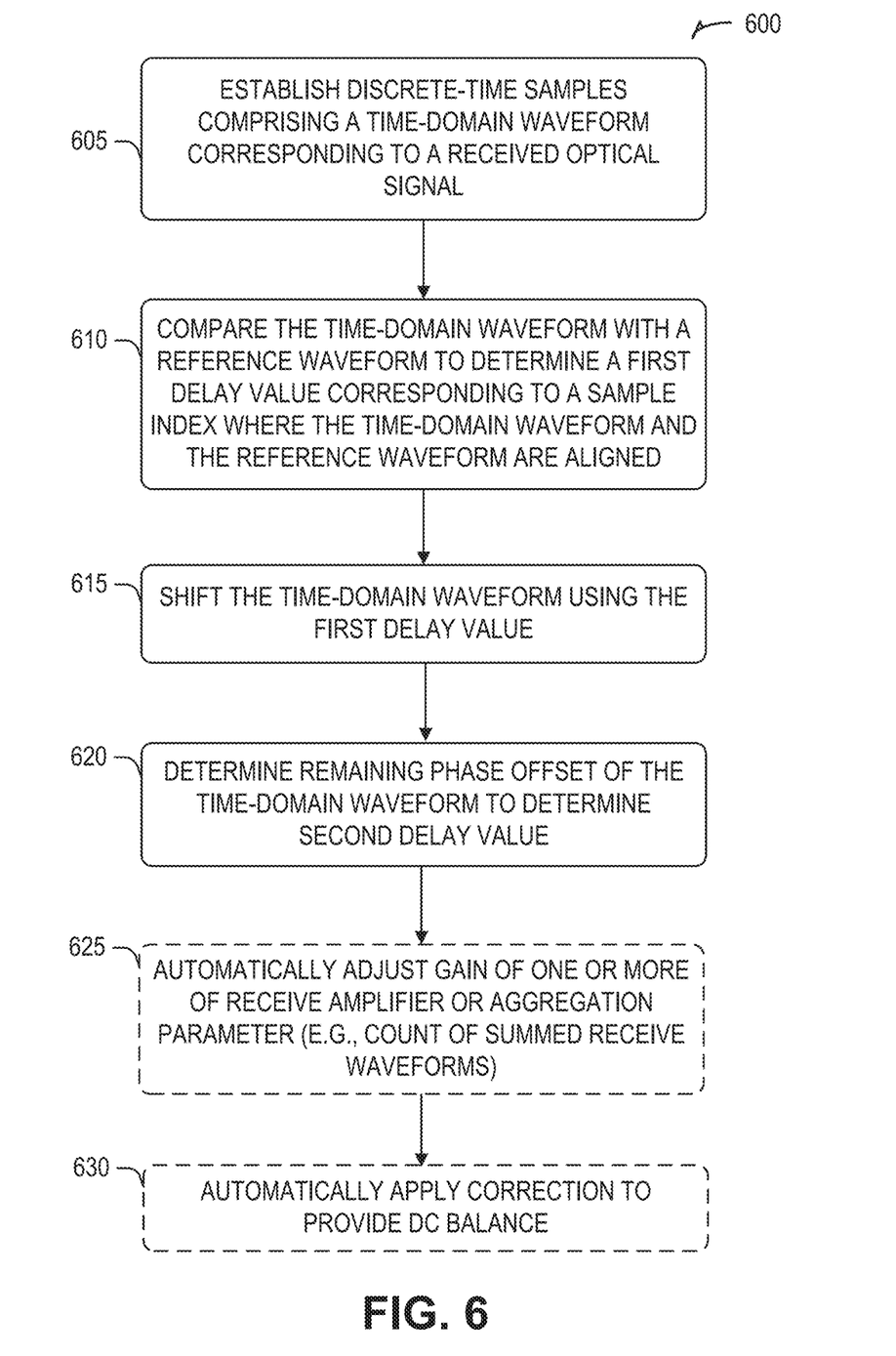
FIG. 6 illustrates generally a technique, such as a method, that can be used to provide delay values that can be used to determine a distance between a target and an optical transceiver.

FIG. 6 illustrates generally a technique 600, such as a method, that can be used to provide delay values that can be used to determine a distance between a target and an optical transceiver. At 605, discrete-time samples can be established, such as obtained using the "front end" circuit 202 shown in FIG. 2 or variations thereof. The discrete-time samples can include a digitized time-series corresponding to a received optical signal. At 610, the time-domain waveform can be compared to a reference waveform (e.g., using a cross-correlation), such as to determine a first delay value corresponding to a sample index (e.g, an integer sample index value) where the time-domain waveform and the reference waveform are aligned. At 615, the time-domain waveform can be shifted using the first delay value. At 620, a remaining phase offset of the time-domain waveform can be extracted, such as shown and described above using a frequency-domain approach, and a second delay value (e.g., a sample $delay_{fraction}$ value) can be determined, such as in terms of a fraction of a sample interval. At 625, the technique 600 can optionally include one or more of automatically adjusting a gain or an aggregation parameter (e.g., a "processing" gain) to provide an automatic gain control scheme. For example, as mentioned elsewhere herein, a count of receive waveforms to be summed together can be adjusted to provide gain control either alone or in combination with gain adjustment of one or more receive signal chain gain values. At 630, the technique 600 can optionally include performing an offset compensation or bias removal, such as by applying a correction (e.g., a specified offset) to a received signal. For example, the technique 600 can include automatically applying a correction to provide DC balance in the received signal, at 630.

Figure 7:
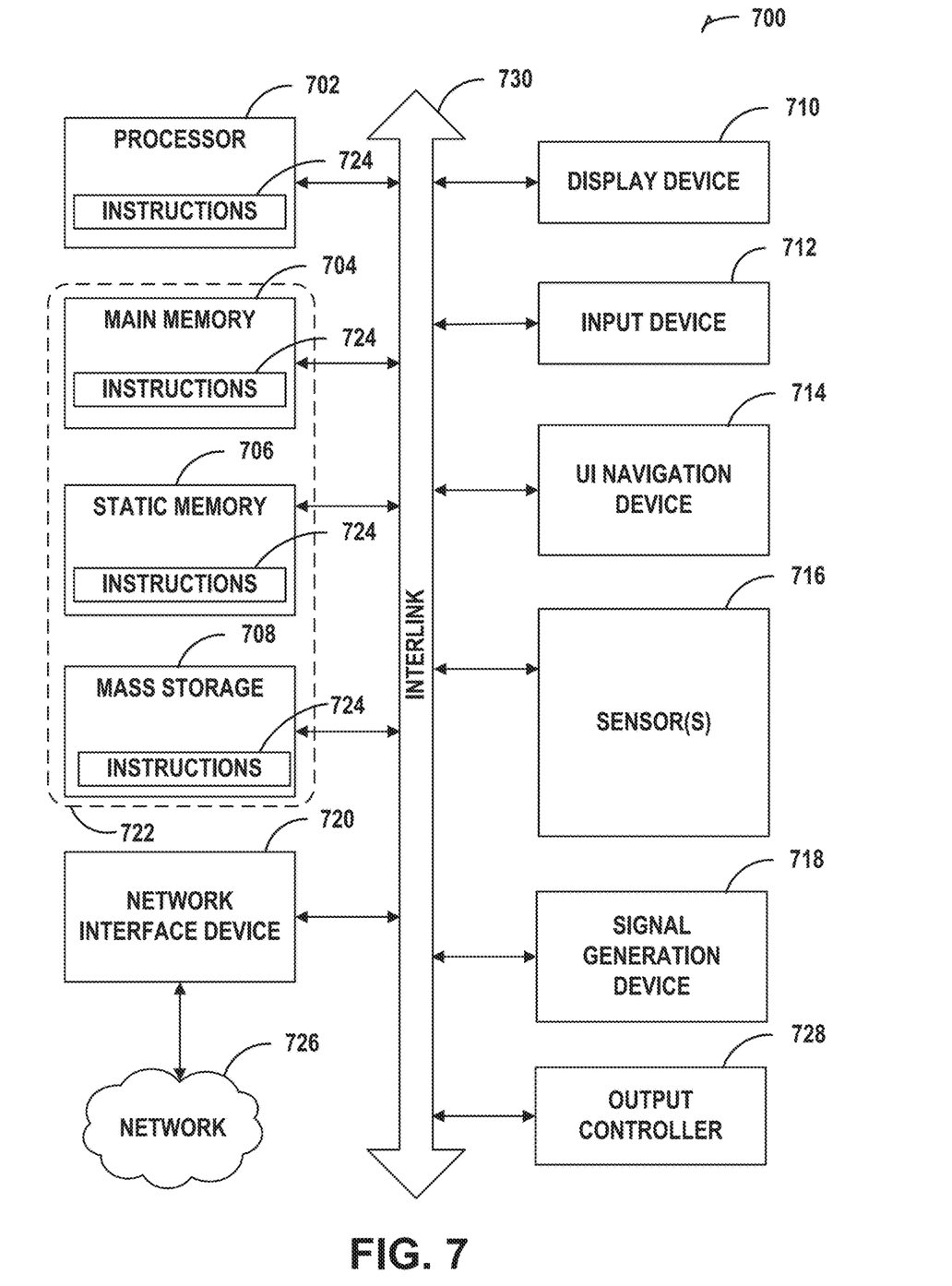
FIG. 7 illustrates a block diagram of an example comprising a machine upon which any one or more of the techniques (e.g., methodologies) discussed herein may be performed.

FIG. 7 illustrates a block diagram of an example comprising a machine 700 upon which any one or more of the techniques (e.g., methodologies) discussed herein may be performed. The machine 1600 may be included as a portion of elements shown in the system 100 of FIG. 1. In various examples, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a personal digital assistant (PDA), a mobile telephone, a web appliance, a network router, switch or bridge, a portable (e.g., hand-held) sensing device such as including a microprocessor or microcontroller, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. "Circuitry" refers generally a collection of circuits implemented in tangible entities that include hardware (e.g., simple circuits, gates, logic elements, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation.

In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®), the IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes

Each of the non-limiting aspects in this document can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second." and "third." etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An automated method for determining a distance between an object and an optical receiver using a reference waveform and a regression technique, the method comprising:
    establishing discrete-time samples comprising a time-domain waveform corresponding to a received optical signal;
    comparing the time-domain waveform with the reference waveform to determine a first delay value corresponding to a sample index where the time-domain waveform and the reference waveform are aligned;
    shifting the time-domain waveform using the first delay value;
    determining a remaining phase offset of the shifted time-domain waveform using the regression technique by applying the regression technique to a frequency-domain representation of the shifted time-domain waveform; and
    using the determined remaining phase offset to determine a second delay value comprising a fraction of a sample interval.

2. The automated method of claim 1, wherein the first delay value corresponds to an integer-valued sample index from amongst the received discrete-time samples where a cross correlation between the reference waveform and the time-domain waveform is maximized.

3. The automated method of claim 1, comprising establishing the reference waveform including applying a distortion model to a kernel representative of a received waveform.

4. The automated method of claim 3, comprising selecting at least one of the kernel or the distortion model at least in part using information indicative of receive channel configuration.

5. The automated method of claim 4, wherein the information indicative of a receive channel configuration includes a receive channel gain value.

6. The automated method of claim 4, wherein the selecting includes applying at least one of the kernel or the distortion model from a look-up table (LUT) corresponding to a specified receive channel configuration.

7. The automated method of claim 1, comprising determining the distance between the object and the optical receiver using a sum of the first and second delay values.

8. The automated method of claim 1, wherein establishing the discrete-time samples includes applying a digital filter block including subtracting pattern noise using a pattern noise template.

9. The automated method of claim 1, wherein establishing the discrete-time samples comprises establishing an aggregated representation of multiple received optical signals.

10. The automated method of claim 1, comprising automatically adjusting one or more of a gain of an analog receive amplifier or a count of summed optical receive waveforms to perform automatic gain control (AGC).

11. The automated method of claim 1, comprising automatically applying a bias correction to the received optical signal prior to conversion of the received optical signal from an analog signal to a discrete-time representation.

12. An electronic system for determining a distance between an object and an optical receiver using a reference waveform and a regression technique, the system comprising:
    an optical receiver including a receive amplifier circuit and an analog-to-digital converter (ADC) circuit;
    a memory circuit;
    a control circuit coupled to the optical receiver, the ADC circuit, and the memory circuit, the control circuit configured to control the optical receiver and the ADC circuit to establish discrete-time samples comprising a time-domain waveform corresponding to a received optical signal, compare the time-domain waveform with the reference waveform to determine a first delay value corresponding to a sample index where the time-domain waveform and the reference waveform are aligned, shift the time-domain waveform using the first delay value, determine a remaining phase offset of the shifted time-domain waveform using the regression technique by applying the regression technique to a frequency-domain representation of the shifted time-domain waveform, and use the determined remaining phase offset to determine a second delay value comprising a fraction of a sample interval.

13. The electronic system of claim 12, wherein the first delay value corresponds to an integer-valued sample index from amongst the received discrete-time samples where a cross correlation between the reference waveform and the time-domain waveform peaks.

14. The electronic system of claim 12, wherein the control circuit is configured to select at least one of a kernel representative of a received waveform or a distortion model at least in part using information indicative of receive channel configuration, and to establish the reference waveform using the selection.

15. The electronic system of claim 14, wherein the control circuit is configured to retrieve at least one of the kernel or the distortion model from a look-up table (LUT) corresponding to a specified receive channel configuration.

16. The electronic system of claim 12, comprising a digital filter block;
wherein the control circuit is configured to establish the discrete-time samples including applying the digital filter block, the applying the digital filter block including subtracting pattern noise using a pattern noise template.

17. An electronic system for determining a distance between an object and an optical receiver using a reference waveform and a regression technique, the system comprising:
a means for establishing discrete-time samples comprising a time-domain waveform corresponding to a received optical signal;
a means for comparing the time-domain waveform with a reference waveform to determine a first delay value;
a means for shifting the time-domain waveform using the first delay value;
a means for determining a remaining phase offset of the shifted time-domain waveform using the regression technique by applying the regression technique to a frequency-domain representation of the shifted time-domain waveform; and
a means for using the determined remaining phase offset to determine a second delay value comprising a fraction of a sample interval.

18. The electronic system of claim 17, wherein the first delay value corresponds to an integer-valued sample index from amongst the received discrete-time samples where a cross correlation between the reference waveform and the time-domain waveform is maximized.

19. The electronic system of claim 17, wherein the means for establishing the reference waveform includes a means for applying a distortion model to a kernel representative of a received waveform.

20. The electronic system of claim 17, wherein establishing the discrete-time samples includes a means for subtracting random and pattern noise from the discrete-time samples.

* * * * *